Patented June 29, 1954

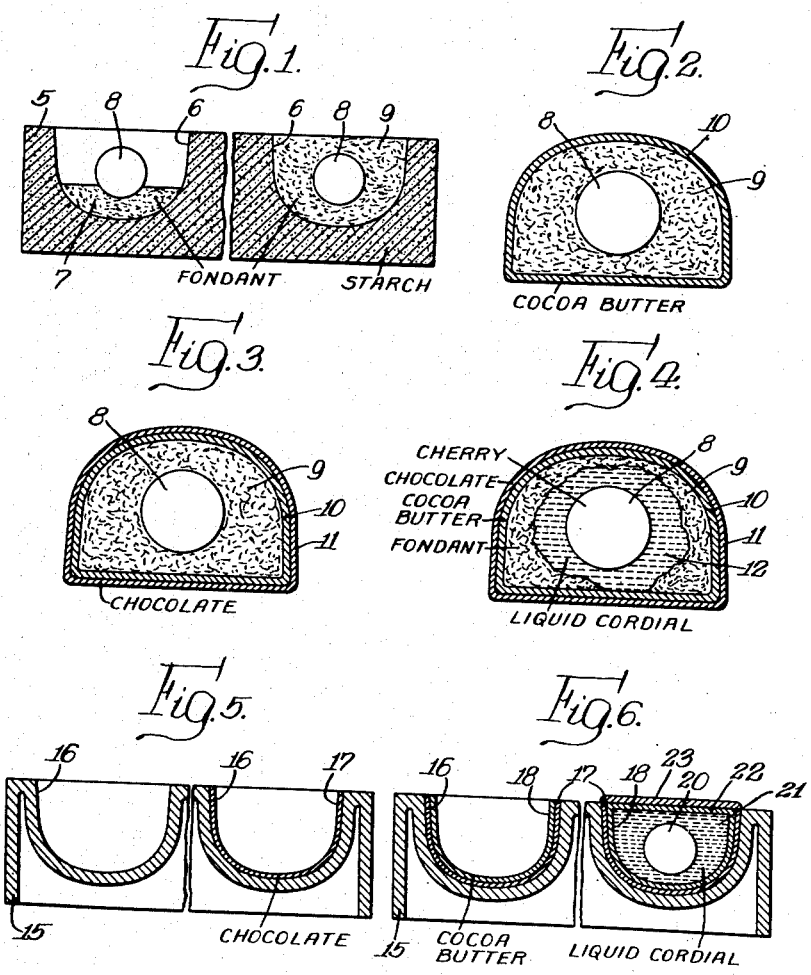

2,682,471

UNITED STATES PATENT OFFICE 2,682,471

CONFECTION AND PROCESS OF MANUFACTURE

Joseph G. Alther, Evanston, Ill., assignor of one-half to Prudence M. Van Arsdell, Chicago, Ill.

Application June 8, 1951, Serial No. 230,611

22 Claims. (Cl. 99—138)

This invention relates, generally, to improvements in confections having fruit, liquid or semi-liquid centers, and to improvements in the methods of making the same.

So-called "chocolate covered cherries" constitute one of the established confections on the market. In the neighborhood of 50 million pounds of this type of confection are sold annually in the United States. This general type of confection, which may be referred to as a fruit center confection, may be made according to two different processes.

According to one process, maraschino cherries or similarly cured cherries are drained substantially free of syrup, and then the individual cherries are placed in starch block molds, the bottoms of which are covered with a small deposit of fondant, and the mold cavities filled with hot fondant. After the fondant has cooled to a firm set, units are removed and coated with a thin layer of chocolate or similar coating material.

In another process, a mold cavity in the form of the top of a chocolate drop is lined or coated in the inverted position with a rather thick shell of chocolate leaving a fairly wide opening corresponding to the flat bottom of the chocolate drop. Each hollow chocolate shell is then charged with suitable syrup and a fruit center, such as a maraschino cherry. Thereafter, the top opening of each shell is closed with a rather thick plug of chocolate, which in the finished confecion constitutes the flat bottom of the chocolate drop. Patent No. 2,163,579 discloses a machine and method of making this second type of confection.

In this second process of making fruit center confections, the chocolate serves as a thick shell and support for the confection. The quantity of chocolate required is much greater than for the first type described. Consequently, confections made by this second process are considerably more expensive than those made by the first process. Also the procedure is more involved. For these reasons, the large bulk of the chocolate coated cherries are made in accordance with the first process. The invention is described in connection with chocolate coated cherries for convenience.

The syrup or liquid portion of the centers of chocolate covered confections is aqueous in nature and hydrophilic as distinguished from being greasy or hydrophobic. In the first described class of chocolate covered cherries, the syrup or liquid portion of the center is formed in situ by an aging action which is referred to by those skilled in the art as "cordialization," and the syrup thus formed is often referred to as the cordial. In the second type, the syrup or cordial is introduced as such during the manufacturing process. The invention relates to both types.

In all classes of confections of the above type there is a marked tendency for the cordial or syrup to exude or leak through the chocolate coating or envelope. Such leaks render the confection unmerchantable. Minimizing of such leaking constitutes one of the important problems confronting the manufacturers.

Leaks develop as a result of a progressive pin-point attack or break down of the chocolate coating. Such break down is inherent due to the nature of the chocolate coatings. Depending upon the grade of the chocolate coating and the degree of refining to which it has been subjected, the crystals of sugar therein are more or less exposed to attack and action by the cordial or syrup. Thus, in high quality chocolate coating which has been subjected to extensive refining, the sugar crystals are reduced to extreme fineness and tend to be homogeneously distributed, and evenly coated with cocoa butter, thereby reducing the extent to which the surgar crystals are exposed. On the other hand, in less expensive chocolate coatings which have been given a much shorter refining treatment and which have a low content of cocoa butter, the individual sugar crystals tend to be much larger and are much less uniformly distributed throughout the chocolate mass, and tend to be incompletely coated with cocoa butter, with the result that rather extensive areas of the sugar crystals are exposed and subject to attack by dissolution. Obviously, once dissolution or attack has started, it will proceed progressively through the chocolate coating from sugar crystal to sugar crystal until a pin-point hole is completed.

Heretofore, two avenues have been open to minimize such break through or leakage: one avenue being that of using chocolate coatings of increased thickness, and the other avenue being that of employing the more highly refined and expensive chocolate coatings.

In addition to the problem of leakage, there is the further problem of entirely covering with chocolate any center which has been molded in starch whereby the chocolate fails to cover those areas of the center to which starch adheres. Such confections are considered imperfect and are rejected, which accounts for much scrap.

In liquid or semiliquid centers the presence of this starch on the outside surface of the center always causes what are known as "leakers" since the chocolate failed to completely enrobe the center. This latter condition presents a serious problem of rejects.

In a broad embodiment, the invention comprises a process for manufacturing liquid center confections by casting heated fondant or other suitable candy filler, in a desired shape around a frozen pellet of fruit, syrup or fruit covered with frozen syrup, which may or may not be capable of inducing cordialization of sugar, whereby the pellet is thawed and the fondant thereby cooled from the inside outwardly, and after it is rigid, covering it with an edible coating to form the finished confection. The frozen pellets may include maple or other syrups, cordials, wine, etc. which may or may not be mixed with ground fruits, nuts, coconut, etc.

One object of the present invention, generally stated, is the provision of chocolate covered or coated confections having cordialized or syrupy centers wherein the chocolate coating is protected from attack by the syrup or cordial by a protective film of an edible, water repellent, grease receptive material.

The required aging of such confections merely for limited cordialization to develop is obviously objectionable. In the first place, the confections can never be sold promptly upon manufacture and the requirement of aging and storage is expensive.

An object of the invention, generally stated, is the provision of a new and improved process of making fruit center confections, particularly chocolate covered cherries, which confection products are superior, even without aging, to those presently available which require an extended period of aging.

An important object of the invention is the provision of confections having fresh fruit centers, particularly fresh cherries, and a suitable method of making such confections on a commercial basis.

Still another object of the invention is the provision of chocolate covered fresh cherries wherein the fresh cherry centers are surrounded by a large amount of syrup or cordial produced in situ by the action of the fruit juices and acids of the fresh fruit acting on a fondant coating, with the syrup or cordial housed in a relatively thin wall of an edible, water-repellent, grease-receptive coating, and an outer chocolate coating.

Certain other objects of the invention will, in part, be obvious and will in part appear hereinafter.

For a more complete understanding of the nature and scope of my invention, reference may now be had to the following detailed description thereof taken in connection with the accompanying drawings, wherein:

Figures 1–4 are diagrammatic sectional views which together show the method of manufacturing one of the two principal types of chocolate covered cherry confections that are on the market, incorporating the improvements provided by the present invention;

Figures 5 and 6 are cross sectional diagrammatic views illustrating the method of making the other principal type of chocolate covered confection on the market, likewise incorporating the improvements provided by the present invention.

Referring first to Figure 1 of the drawings, the reference character 5 designates a mold formed from a block of starch with the upper face thereof being provided with a plurality of mold cavities 6—6. In practicing the present invention, each of the mold cavities 6 is first provided with an initial deposit of fondant, as indicated at 7, and then a maraschino cherry 8, or other fruit filling, is put in place. Thereafter, the filling of each mold cavity 6 with heated fondant is completed, as shown by the right hand cavity in Figure 1.

After the fondant or cream 9 becomes sufficiently firm, each of the cavities 6—6 is emptied. At least some of the centers unavoidably have areas where the starch adheres. The process as described thus far conforms to known technique and procedure in the manufacture of chocolate covered cherries. However, at this point, an innovation is introduced in accordance with one embodiment of the present invention. This innovation involves providing the centers removed from the starch mold 5 with a surrounding envelope or film of an edible, water-repellent, grease-receptive film 10 as shown in Figure 2. The particular manner in which the film 10 is applied is not critical and several different techniques may be used. For example, the centers may be immersed or dipped in a fluid bath of the film material, or the film material may be sprayed onto the centers suitably supported. Obvious refinements are available for controlling the thickness of the film 10. Thus, a film of increased thickness can be obtained by cooling or refrigerating the fondant centers as well as lowering the temperature of the fluid film material. If desired, the film can be built up by successive applications of the film material. Those skilled in the confection making art will have no difficulty in providing the centers with films 10 of the desired thickness. It has been found that a film constituting as little as 1% by weight of the completed confection will be adequate, although heavier films may be used if desired.

A number of suitable materials are available which may be used for forming the film 10. Cocoa butter is the presently preferred material since it has very desirable water-repellent, grease-receptive, starch-absorptive properties and is a natural constituent of the chocolate coatings. Furthermore, it has been found that when the hot chocolate is applied to the cream centers in the final coating process, it adheres uniformly to the film 10.

Other materials which will form edible, water-repellent, grease-receptive, starch-absorptive films 10 include hydrogenated vegetable oils, hydrogenated fats, cocoanut oil, beef tallow, palm kernel oil, paraffin, mutton tallow, etc. Mixtures may be made of one or more of these materials. For example, a 50–50 mixture of cocoa butter and hydrogenated fat has been used with complete success. These coating materials should all be hard and have melting points well above normal room temperature, say at least above 100° F. If desired, the films 10 may be flavored and colored without impairing their water-repellent, grease-receptive characteristics. They should not contain sugar.

It has been found that the films 10 have an affinity for such starch as may adhere to the surface of the centers removed from the starch molds, thereby insuring complete coverage of the centers with the film.

After the cream or fondant centers have been provided with the films 10, they are next given a coating 11 of chlocolate as shown in Figure 3. The chocolate coating may be applied in known manner, care being taken to prevent mutilation of the envelope or film 10 in each instance. During the coating, the films 10 band uniformly to the coating so as to form an inner lining therefor.

As freshly manufactured, the chocolate covered cherries shown in Figure 3 contain the fondant centers 10 in semi-solid or plastic consistency, uniformly throughout. However, upon aging, the juice associated with the maraschino cherries 8—8 acts upon the fondant 10 and breaks it down into a liquid or syrup, this action being known in the art as "cordialization." In fact, the trade demands that this cordialization should have taken place and confections of this type are largely judged on the extent to which cordialization has progressed.

In Figure 4 of the drawings, a cross sectional view is shown illustrating the structure of the confection shown in Figure 3 after cordialization has taken place with the liquid cordial or syrup formed being indicated by the reference numeral 12.

It is this liquid or syrup 12 which tends to attack the chocolate coating of the confection in the manner described hereinabove. However, the protective film 10, which is devoid of sugar crystals or other water soluble particles, resists attack by the liquid cordial 12 where the film 10 is contacted thereby. That is to say, the film 10 shields or protects the chocolate coating 11 to which it adheres.

The films 10, covering and absorbing as they do any starch deposits on the cream or fondant centers, enable the chocolate coating completely to cover the centers with no scrap or rejects arising through failure to cover the starch deposits.

According to a preferred embodiment, the fruit 8 is given a sharp deep freeze by known methods. Temperatures below 0° F. are generally used, and may be below —10 to —20° F. The fruit is in the form of hard pellets. The syrup adhering to the frozen fruit is also frozen, and the layer of frozen syrup or juice may be further built up by spraying it thereon under deep freeze conditions.

In certain instances, a liquid center is desired without fruit being present. In this case, the pellet 8 is formed of frozen syrup or cordial and the hot fondant is cast around it. The syrup from which the pellet is made may be flavored as desired and the acidity may be controlled so as to control the extent of the subsequent cordialization of the fondant. The manner of doing this is well known to the prior art and need not be described in detail.

The syrup may contain such ingredients as acidified sugar, for example, with citric acid, maraschino juice, and a wide variety of other flavors and colors. The degree of sugar inversion (cordialization) in the finished product is dependent upon the amount of syrup and juice frozen in and around the fruit centers.

According to one method suitable for large scale production, the frozen maraschino cherries are placed in a rotating drum which is chilled from the outside either by a blast of cold air or other suitable refrigerant. As the frozen cherries are being agitated in the drum, they are sprayed with additional syrup which freezes on the cherries. In this way, an envelope of frozen syrup may be built up to a desired controlled thickness on the cherries.

From this point on, the confection is made as above described in connection with Figs. 1–4.

There are several important advantages in using the frozen fruit or the frozen pellets of syrup. When hot fondant is cast over the frozen fruit, it causes the fondant to cool and set quickly, and from the inside. The necessity for slow cooling in a cooling room to set the fondant is minimized or eliminated. A great advantage is the flexibility obtained to produce any degree of cordialization desired with either high temperature 245 to 250° F. quick setting cooked fondants, or a low temperature 232 to 235° F. slow setting cooked fondants. Present practice is limited to the use of a low temperature cooked fondant primarily because the maraschino cherry is lacking in acid. The candy or fondant portion must retain softness or plasticity in order to meet the requirements demanded by the consumer. Our new method readily permits the use of high temperature cooked, quick setting fondant with its attendant advantages of a harder, cleaner, more easily handled product for enrobing, while obtaining all the benefits of quick cordialization. In addition, the product is ready for marketing much sooner than is now possible.

Since my preferred method employing the frozen fruit causes the preferred high temperature cooked fondant to set quickly, the confection can be dipped to form the finished confection; or first covered with the water-impervious layer and immediately thereafter with the chocolate. In conventional commercial practice wherein the fondant is cooled from the outside in, the fondant near the center of the confection often retains considerable heat which has a deleterious effect on the chocolate coating. By cooling from the inside out, as is accomplished by my method, this deleterious effect does not take place.

The method has a further advantage that the frozen syrup on the outside of the fruit melts, due to absorption of heat from the fondant. The fruit itself thaws and the acid within the fruit and the syrup immediately begin the process of cordializing the fondant by hydrolyzing the sucrose into liquid levulose and dextrose which automatically mix with the natural juices and sugars of the fruit and with the syrup thus introduced. It is desirable to have as high a proportion of the fondant cordialized as possible and within a short period of time. This method permits complete cordialization of the fondant or cordialization to any desired extent. It also permits more rapid action because a part of the fondant becomes dissolved and part of it cordializes quickly. This is especially true when fresh fruit, particularly highly acidic fruits such as cherries, are employed.

When a pellet of frozen syrup or cordial is used, it is evident that the confection will have a liquid center immediately upon the melting of the pellet. Hence, such confections can be sold shortly after manufacture.

It is also evident that the process using the frozen fruit is advantageous, whether the impervious layer between the center and the outer coating is used or not.

Heretofore, it was not possible to use fresh fruit unless a portion or all of the acid therein was neutralized. Such a process is described in U. S. Patent 1,573,078 to McCool. The cordialization of the fondant and the action of acids on the thin chocolate coating caused the formation of leaks so that the use of fresh, unneutralized fruit was not considered practical, due to the high percentage of rejects. The use of the water-impervious coating between the center and the chocolate covering reduces the number of rejects because the slightly acid cordialized fondant does not come in direct contact with the chocolate.

It has been found that confections made by this method contain as much cordial within two or three days after manufacture as is now found after an aging period of about three weeks to a month in high grade chocolate covered cherries made in accordance with the first described conventional method.

Cordialization to the extent shown in Figure 4 or even greater occurs within two to ten days as contrasted with a period of three to four weeks for conventional practice.

Among the fruit which may be frozen and coated with frozen syrup are fresh cherries, maraschino cherries, pieces of pineapple, berries, grapes, etc.

The syrup frozen on the fruit center may vary widely in its specific nature including variations in flavor and color. Other fillings than fondant may be used, including marshmallow, jelly gum, etc. Likewise, the outer coating instead of being chocolate, may comprise other familiar candy-coating materials, such as the sugar coatings used for coating bonbons, etc.

It is also apparent that a large portion of the cordial surrounding the fruit center may be provided by increasing the thickness of the frozen envelope of syrup surrounding the fruit when the confection is made. The syrup with which the frozen fruit is covered may also be modified to accelerate the rate of cordialization. For example, this can be done by adding citric acid or the like to the syrup before the fruit and syrup are frozen.

When fresh fruit is used, it is first sterilized by any of the well-known techniques heretofore employed, such as blanching in boiling water, steaming or exposure to bacteria-killing rays.

In some instances, when using highly acid fruit, such as berries and cherries, the fruit is frozen without encasing it in syrup. The natural fruit acids are sufficient to bring about rapid cordialization of the fondant. The natural flavor and tartness of the fresh fruit is, to a large extent, preserved.

The method permits candy to be sold within a few days after manufacture, the confections containing a high proportion of liquid cordial. Consequently, it reaches the market fresher than does the conventional type of candy which must be aged for several weeks to insure cordialization. This means improved flavor, as well as a reduction in cost, equipment for storage, etc.

It is also possible to add other flavoring as well as traces of the well-known preservatives. Spoilage due to fermentation has not been found to occur to any substantial extent, even when employing fresh fruit. The solid frozen state of the fruit makes handling considerably easier. It is of course apparent that the fruit or syrup must not be allowed to thaw before being surrounded by the fondant if the full advantages of the preferred process are to be realized. This, however, offers no problem.

Fruit center confections made by the second described conventional method are more expensive and the problem of leakage is even more serious. In this connection, I have reference to the type of confection which, in brief, is made by forming a rather heavy shell of chocolate with its bottom open and into which is charged a suitable syrup and fruit filling, after which the opening of the shell is closed with a rather thick plug of chocolate. In the finished confection, the thick plug of chocolate constitutes the flat bottom of the chocolate drop. In this type of confection, the contents of each individual piece of candy is in the form of a syrup or cordial, the chocolate coating or shell is exposed to attack over most of the inner surface thereof. My present invention serves effectively to protect this type of confection against leakage.

Reference may now be had to Figures 5 and 6 of the drawings for a description of a method of making the second type of chocolate covered cherry confection in which the present invention is incorporated. In Figure 5, the reference numeral 15 designates a metal mold provided with a number of cavities 16—16. The chocolate lining or shell 17 may be formed by filling the cavities with melted chocolate and then emptying the same. After the cavities 16 have been lined with shells of chocolate 17, these shells are next provided with an inner film 18 (Figure 6) of a water repellent, grease receptive, film forming material, such as cocoa butter, or one of the other materials mentioned above in connection with films 10. Several techniques are available for forming the films 18. Thus, the melted film forming material, such as cocoa butter, may be poured into the chocolate shells 17 and then immediately poured out before the shells are melted. The thickness of the films 18 may be controlled by the temperature of the molds 15 and the chocolate shell 17 as well as by the temperature of the melted cocoa butter. Lower temperatures in each instance tend to increase the thickness of the films 18, while higher temperatures tend to decrease the thickness. Several applications of the cocoa butter may be made if films of increased thickness are required. It is also possible to form the films 18 by spraying or brushing the film forming material onto the interior of the shells 17.

After the films 18 have been formed, the shells 17 are next filled with the fruit centers and liquid or syrup filling material. Thus, as shown in Figure 6 a maraschino cherry 20 may be inserted in each shell 17 along with a filling of cordial or syrup 21. The level of syrup or cordial 21 does not quite come to the top of the chocolate shell 17 in inverted position as shown, thereby leaving room for application of a top layer of film of cocoa butter 22 which with the film 18 forms a complete envelope around the center filling of the confection. After the layer 22 of cocoa butter has set sufficiently, the chocolate shells 17 are closed by a rather thick layer of chocolate 33. After this flat closure or layer of chocolate 23 has solidified, the candy or confection pieces may then be removed from the molds 15 and are ready for packaging and sale.

Although the invention has been specifically illustrated in connection with two commercial types of confections, it is obvious that the invention has application to chocolate covered confections broadly when these confections have liquid or partly liquid centers, or any chocolate covered confection whereby the centers have been molded in starch.

Having fully described my invention and the best embodiments thereof, what I claim as new is:

1. In the process of manufacturing a liquid center confection, the steps comprising forming a frozen pellet of an edible substance, casting warm candy center material in a desired shape around the frozen pellet, thereby cooling the center material from the inside outwardly, and thawing the frozen pellet, and when said center material is rigid, coating it with an edible coating.

2. In the process of manufacturing a liquid center confection, the steps comprising forming a frozen pellet of an edible substance containing free acid in an amount sufficient to induce cordialization of sugar, casting warm candy center material in a desired shape around the frozen pellet, thereby cooling the center material from the inside outwardly, and thawing the pellet, and when said center material is rigid, coating it with an edible coating.

3. In the process of manufacturing a liquid center confection, the steps comprising forming a frozen pellet of an edible substance, casting warm candy center material in a desired shape around the frozen pellet, thereby cooling the center material from the inside outwardly, and thawing the frozen pellet, and when said center material is rigid, coating it with a film consisting essentially of an edible, water-repellent, grease-receptive material, and then with an edible candy coating.

4. In the process of manufacturing a liquid center confection, the steps comprising forming a frozen pellet of an edible substance capable of inducing cordialization of sugar, casting warm candy center material in a desired shape around the frozen pellet, thereby cooling the center material from the inside outwardly, and thawing the pellet, and when said center material is rigid, coating it with a film consisting essentially of an edible, water-repellent, grease-receptive material, and then with an edible candy coating.

5. In the process of manufacturing a liquid center confection, the steps comprising forming a frozen pellet of an edible substance, casting warm fondant in a desired shape around the frozen pellet, thereby cooling the fondant from the inside outwardly, and thawing the pellet, and when said fondant is rigid, coating it with an edible coating.

6. In the process of manufacturing a liquid center confection, the steps comprising forming a frozen pellet of an edible substance containing free acid in an amount sufficient to induce cordialization of sugar, casting warm fondant in a desired shape around the frozen pellet, thereby cooling the fondant from the inside outwardly, and thawing the pellet, and when said fondant is rigid, coating it with an edible coating.

7. The process of claim 5 wherein the coating is chocolate.

8. The process of claim 5 wherein the pellet is frozen fruit.

9. The process of claim 5 wherein the pellet is frozen syrup.

10. The process of claim 5 wherein the pellet is frozen fruit covered with a layer of frozen syrup.

11. The process of claim 5 wherein the fruit is fresh cherry.

12. The process of claim 5 wherein the fruit is maraschino cherry.

13. The method of making a liquid center, chocolate coated confection which comprises, forming an open shell of chocolate in a mold cavity, providing the interior of said chocolate shell with a film consisting essentially of a water-repellent, grease-receptive material, filling said shell with a liquid center, providing the open end with a film consisting essentially of a water-repellent, grease-receptive material, and sealing the open end with chocolate, thereby providing the entire interior of chocolate coating with said film.

14. The method of producing coated confections having cordial centers which comprises sharp freezing sterilized fruit, surrounding said fruit with warm fondant in a mold whereby the fondant sets by virtue of the frozen fruit and the fruit is thawed, surrounding the fondant with a continuous film consisting essentially of an edible, water-repellent, grease-receptive material, and coating the body thus formed with an edible candy-coating material.

15. The process of claim 3 wherein the candy coating material is chocolate.

16. The process of claim 3 wherein the water-repellent material is cocoa butter.

17. A chocolate coated confection wherein the interior of the chocolate coating is provided with a continuous lining consisting essentially of a water-repellent, grease-receptive film.

18. A chocolate coated confection wherein the interior of the chocolate coating is lined with a film consisting essentially of cocoa butter.

19. A chocolate coated confection comprising, a center molded in starch and having particles of starch adhering thereto, a film consisting essentially of a water-repellent, grease-receptive material completely covering said center including said starch particles, and a coating of chocolate over said center and film.

20. A chocolate coated confection having at least a partially liquid center, and a film consisting essentially of a water-repellent, grease-receptive material separating the chocolate coating from said center.

21. A chocolate coated confection having at least a partially liquid center, and a film consisting essentially of cocoa butter separating the chocolate coating from said center.

22. In the method of making a chocolate coated confection having a center molded in starch, the improvement which comprises providing said center with a continuous film consisting essentially of a water-repellent, grease-receptive material prior to enrobing the center with chocolate.

References Cited in the file of this patent

UNITED STATES PATENTS

| Number | Name | Date |
|---|---|---|
| 1,518,737 | Griffith | Dec. 9, 1924 |
| 1,573,078 | McCool | Feb. 16, 1926 |
| 2,434,987 | Burbank | Jan. 27, 1948 |
| 2,516,891 | Lloyd | Aug. 1, 1950 |